G. E. COOPER.
Harvester.

No. 21,741.

2 Sheets—Sheet 1.

Patented Oct. 12, 1858.

G. E. COOPER.
Harvester.
No. 21,741.
2 Sheets—Sheet 2.
Patented Oct. 12, 1858.
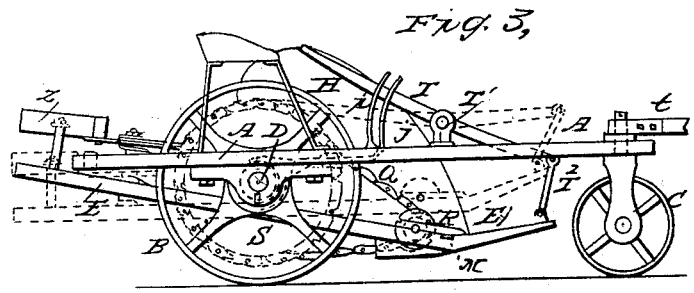
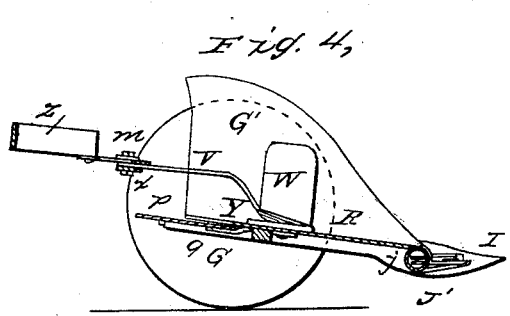
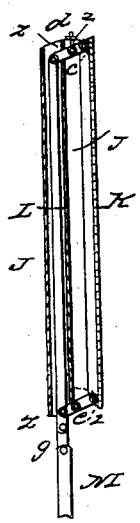
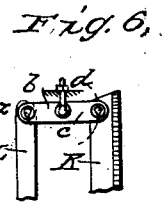
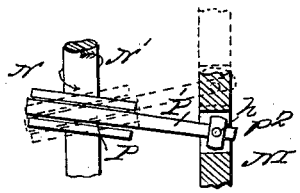
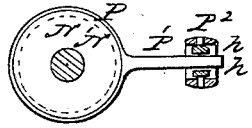
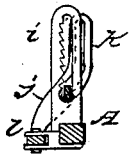
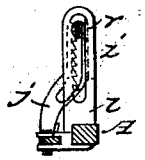

UNITED STATES PATENT OFFICE.

GEO. E. COOPER, OF BALTIMORE, MARYLAND.

IMPROVEMENT IN HARVESTERS.

Specification forming part of Letters Patent No. 21,741, dated October 12, 1858.

*To all whom it may concern:*

Be it known that I, GEO. E. COOPER, of the city and county of Baltimore, in the State of Maryland, have invented certain new and useful Improvements in Reaping and Mowing Machines; and I do hereby declare the following to be a full, clear, and exact description thereof, reference being had to the accompanying drawings of the same, which make part of this specification, and in which—

Figure 1:
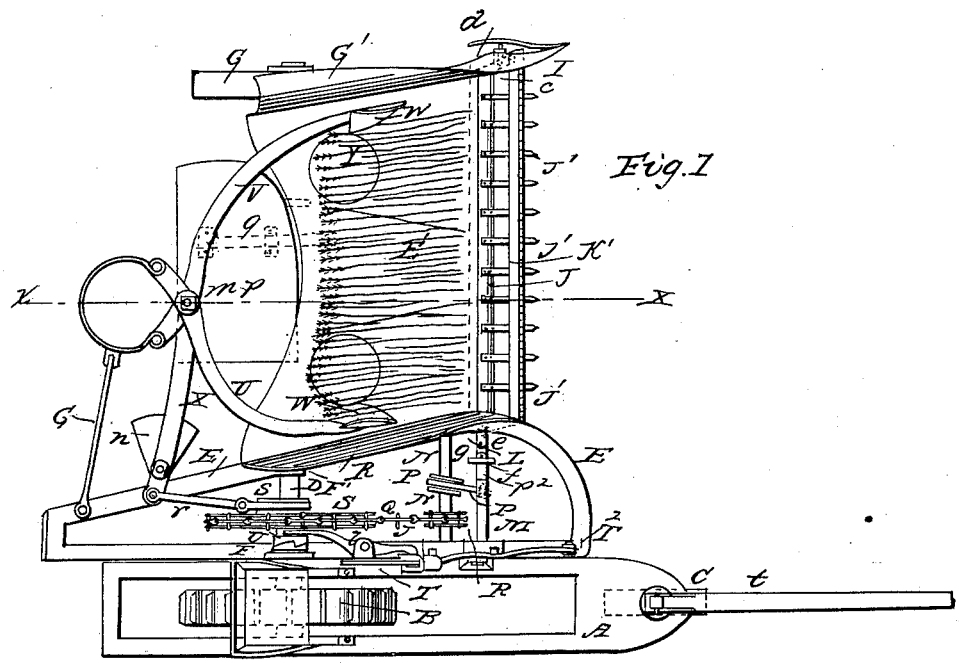
Figure 2:
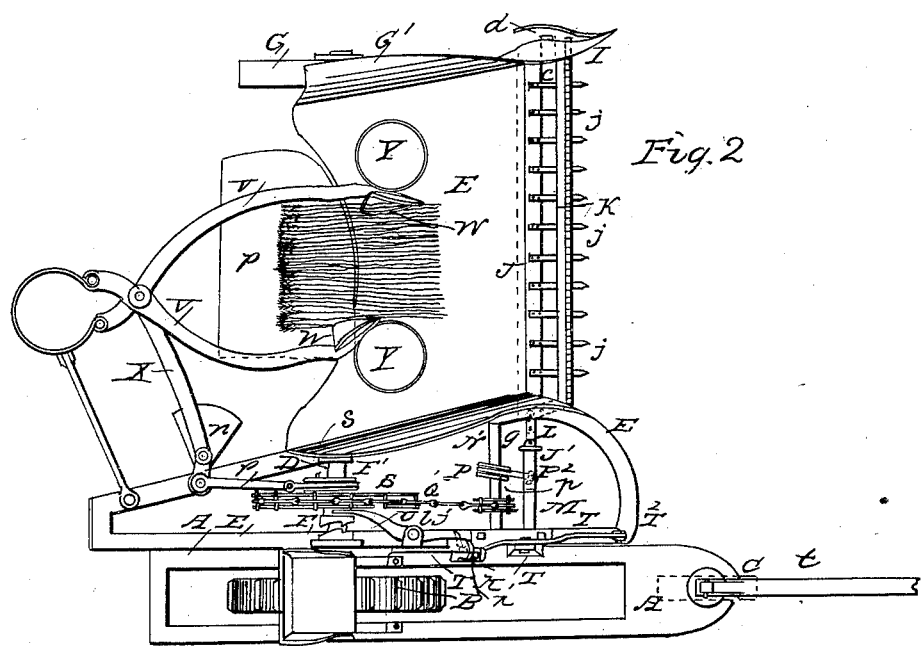

Figure 1 represents a top view of a machine embracing my improvements, the arms or hands which constitute the rake being in the position they occupy just previous to closing to form the cut grain into a sheaf. Fig. 2 represents a similar view, the raking mechanism having formed the cut grain into a sheaf and drawn it to the position to be discharged when the hands again open. Fig. 3 represents a side view of said machine. Fig. 4 represents a section of the same at the dotted line $x$ $x$ of Fig. 1. Fig. 5 represents a horizontal section of the tubular finger-bar, showing the manner of straining the cutter; and Fig. 6, an enlarged view of a fragment of the cutter and straining-bar, showing the knife-edged bearings by which they are connected to the arm of the adjusting-screw. Fig. 7 represents a top view of the device for reciprocating the cutter, and Fig. 8 a side view of the same. Fig. 9 represents the guide-rack, through which the lever passes for raising and lowering the cutting apparatus, and Fig. 10 the same. In these two figures the operating end of the clutch-lever is shown in its two positions—that is to say, when in and out of gear with the driving-wheel.

The improvements which I have made relate to the cutting apparatus, combining with the lever for raising and lowering the cutting apparatus the lever or handle of the clutch, whereby the raising of the cutter higher than that at which it is required to cut the grain simultaneously and by the same lever disengages the clutch and stops the motion of the cutter and raking mechanism, and the employment of mechanism for delivering the cut grain from the platform, consisting of two hands having a horizontal advancing and receding motion in the direction in which the machine travels, said hands opening, as they move forward, to embrace the cut grain, and closing as they recede from it, to form it into a gavel and deliver it at the rear of the platform.

In the accompanying drawings, A represents a horizontal narrow frame, which supports the seat for the driver, and is carried by a driving-wheel, B, and a guiding fore wheel, C. The axle D of the driving-wheel is secured in suitable bearings in the frame A, and projects beyond its side a sufficient distance to allow the main frame E, which supports the platform E', to be suspended therefrom by two studs, F F', and the inner or divider side of said frame is carried by a wheel, G, protected from the cut grain by a guard-board, G*, rising from the finger-tube. A similar guard, H, also rises from the opposite end of the platform to prevent the cut grain from being entangled with the driving mechanism.

The divider I consists of an iron shoe or point attached to the end of the finger-tube, and projects in advance of the guard-fingers and outside of the track of the wheel G, so that the latter is prevented from running into the standing grain.

The finger-bar consists of a cylindrical tube, J, thin to make it light, and the guard-fingers J' may be riveted thereto, or made with the tube. It is secured in any suitable manner to the frame.

The cutter K is composed of a blade of cast-steel made as thin as possible, with a due regard to strength, and mounted in the front ends of pivoted arms $a$ $b$, one of which, $a$, is pivoted in a mortise in the projecting end of the side beam, and the other, $b$, vibrates in a mortise in the divider upon a knife-edge pivot, $c$, attached to an adjusting-screw, the shank of which projects outside the divider to receive a nut, $d$, by which it is held in place. The cutter is hung upon and vibrated by these arms in the arc of a circle scribed from the pivots, and being made very thin requires therefore, to be kept under constant tension, and for this purpose a straining-bar, L, is mounted in the rear ends of the pivoted arms $a$ $b$, is inclosed by and passes through the finger-tube, and is thus protected from accident, so that, it will be seen, by turning the nut $d$ (which bears against the divider) to the right, the pivot of the opposite arm being fixed, will draw the adjusting-screw and arm $b$, so as to strain and thereby stiffen the cutting-blade, by which I am enabled to use a very thin blade having no stock and working over the fingers with little or no friction. To protect the projecting end of the screw and nut from the standing grain, a curved shield may be attached to the point of the divider, as shown in the drawings. In order to diminish the friction of the working-joints of the cutter, the pivots $c$ and $e$ of the vibrating arms and the bearings 2 2 2 2 of the cutter and straining-bar are made knife-edged, so as to form the bearing, as shown in Figs. 5 and 6. Motion is communicated to the knife through a horizontal sliding bar, M, one end of which is fitted in a mortise in the frame and the other is supported by a guide, $f$, and connected to the straining-bar by an intermediate link, $g$, to prevent the curved motion of the straining-bar (which also vibrates in the arc of a circle but less than that of the cutter) from being communicated to the sliding bar.

The device for producing the reciprocating motion of the cutter consists of a small plain annular disk, N, mounted centrally upon a horizontal shaft, $N'$, placed parallel to the sliding bar M. It has a groove in its circumference to receive a metallic strap or band, P, from which an arm or shank, $P'$, projects into and through an eye in the sliding bar, thus connecting the two together. A plain disk placed centrally upon its shaft would not, however, produce any other motion than that which is concentric with its axis. This disk N is therefore placed at an angle to the axis of the shaft and applied to vibrate the cutter. Every revolution of the disk vibrates the cutter twice, and the length of its stroke is always equal to the angle at which the disk is set. Therefore, in order to vary the throw of the cutter for reaping and mowing, I propose to make the disk adjustable, either by screws or wedges, so as to vary its angle with the axis of its shaft. The end of the arm $P'$ is fitted into an eye, $h$, pivoted within the eye $P^2$ of the sliding bar, so that the vibrations of the arm in opposite direction turns or swivels the eye $h$ upon its pivots. The shaft of the disk is driven by a chain, Q, encircling a small pulley, R, thereon, and a large pulley, S, on the projecting end of the shaft of the driving-wheel.

The cutting apparatus is raised and lowered by means of the lever T, pivoted to a standard, $T'$, rising from the frame A. Its front end is connected to the front of the main frame by a link-rod, $T^2$, and its handle extends back through a guide-rack, $i$, within reach of the driver, who, by his foot or hand, can elevate or depress the cutter. The guide-rack $i$ is mounted on the frame A, and is notched on one side, into which the lever takes, and is held either by a small spring on the side of the handle or by the lateral spring of the handle itself.

The pulley on the driving-shaft is connected with a clutch, $u$, for engaging and disengaging it with the driving-wheel. The clutch is of the usual construction, but its handle $j$ is connected with the adjusting-lever by means of a peculiar-shaped slot, $k$, through which the lever-handle passes. It will be noticed, however, that the handle of the clutch is unaffected by the raising or lowering of the lever to adjust the cutter to suit the grain to be cut, but when for any cause it is necessary to stop the motion of the cutter, or in drawing the machine from the barn to the field, it is necessary to raise the cutter higher than that at which it is used when cutting grain, the act of depressing the lever T simultaneously operates on the bent portion of the slot and forces the front end of the clutch-lever outward, as shown in Figs. 2 and 9, and its rear end inward, and thus moves the pulley upon its shaft and disengages the clutch, and when the lever T is again raised to lower the cutter the slot $k$ is again acted on and forces the front end of the clutch-lever inward, as shown in Figs. 1 and 10, and again engages the clutch with the driving-shaft. The clutch-lever is pivoted to the frame A at $l$.

The raking mechanism consists of two arms, $v$, each furnished with a hand, $w$, located and operating at the rear of the platform. The arms are curved, as represented, and crossed near their rear ends, and mounted by a pivot or center, $m$, upon the end of a carrying-arm, X, which is also pivoted at its other end to a plate, $n$, on the main frame, by which the carrying-arm is also supported. The hands which the arms carry are so shaped at their base as to slide upon the platform and gather the cut grain between them, and to catch against the periphery of two horizontal disks, Y, when advancing, to be opened with their arms to embrace the grain, and when receding to be closed. These disks Y are situated near each end and at the rear of the platform, and mounted upon pivots, so as to be free to be turned by the hands, in passing around them, for diminishing the friction thereof. The rear ends of the arms are connected by a spring, $z$, which causes them to open, when the sheaf is discharged, a sufficient distance to cause them, when advancing, to strike the disks, so as to insure the arms being opened. Another arm, $o$, connected with a standard on the rear end of the main frame, is attached to the spring, and serves to steady the back and forward motion of the arms. The rear edge of the platform is curved inward toward the finger-bar, and a tilting platform, $p$, is so hinged in the rear as to receive the gavel from the hands. The weight of the gavel will cause it to turn upon the rod $q$, and thus deliver it at the side of the machine. The inner end of the tilting platform is weighted to cause it to assume a horizontal position to receive the next gavel.

The motion of the raking mechanism is effected by means of a connecting-rod, $r$, attached by one end to the outer end of the carrying-arm and by the other to a band encircling an eccentric, $s$, attached to the face of the pulley on the driving-shaft. This eccentric is of such a shape and so placed as to cause the hands to advance and recede, and thus form and deliver a gavel at each revolution of the driving-wheel.

It will be observed that, as the eccentric which drives the rake is secured to the pulley which carries the clutch, the same movement of the lever which disengages the motion of the cutter also disengages the motion of the rake from the driving-shaft.

The fore wheel, which supports the front end of the supplemental frame, is mounted in a standard, the shank of which passes through the frame and is round, and to its upper end the tongue $t$ is attached, by which the horses draw the machine, so that the wheel turns in the same direction with the tongue, and thereby facilitates the turning and guiding of the machine.

I have not represented the reel in the drawings, but intend to use one in constructing my machine.

The platform and raking mechanism must be so constructed as to be readily removed when the machine is to be adapted for mowing.

Having thus described my improvements in harvesting-machines, what I claim therein as new, and desire to secure by Letters Patent, is—

1. The combination of the straining-bar, finger-tube, and adjusting-screw with the arms upon which the cutting-blade is mounted, for the purpose of keeping the cutter, which is made thin and without stock, under constant tension, substantially as described.

2. Combining the lever of the shifting-clutch with the lever for raising and lowering the cutting apparatus, in the manner herein described, so that when it is necessary to stop the motion of the cutter the act of depressing the lever performs the threefold duty of raising the cutter, stopping its motion and the motion of the raking mechanism as herein described. I do not claim, however, either of these levers, separately considered, nor the functions they perform.

3. The arrangement of the raking mechanism, consisting of two hands which open, as they advance over the platform on each side of the cut grain, and close as they recede to form the cut grain into a sheaf and deliver it at the rear of said platform, substantially as herein described.

In testimony whereof I have hereunto subscribed my name.

GEO. E. COOPER.

Witnesses:
HENRY GREER,
JNO. H. JOHNSON.